US010304281B2

(12) United States Patent
Morin

(10) Patent No.: US 10,304,281 B2
(45) Date of Patent: May 28, 2019

(54) MULTIPLAYER AND MULTIGAME ELECTRONIC WAGERING TABLE GAME SYSTEM USING LIVE DEALER

(71) Applicant: ARUZE GAMING (HONG KONG) LIMITED, Hong Kong (HK)

(72) Inventor: Kelvin Morin, Winnipeg (CA)

(73) Assignee: Aruze Gaming (Hong Kong) Limited, Quarry Bay (HK)

( * ) Notice: Subject to any disclaimer, the term of this patent is extended or adjusted under 35 U.S.C. 154(b) by 0 days.

(21) Appl. No.: 15/674,954

(22) Filed: Aug. 11, 2017

(65) Prior Publication Data

US 2018/0144576 A1 May 24, 2018

Related U.S. Application Data

(60) Provisional application No. 62/425,287, filed on Nov. 22, 2016.

(51) Int. Cl.
*A63F 13/00* (2014.01)
*G07F 17/32* (2006.01)

(52) U.S. Cl.
CPC ........ *G07F 17/322* (2013.01); *G07F 17/3223* (2013.01); *G07F 17/3239* (2013.01)

(58) Field of Classification Search
CPC ............................ G07F 17/32; G07F 17/3225
See application file for complete search history.

(56) References Cited

U.S. PATENT DOCUMENTS 7,914,368 B2 3/2011 Chun
7,918,723 B2 4/2011 Chun
7,922,587 B2 4/2011 Chun
8,210,920 B2 7/2012 Chun
8,585,505 B2 11/2013 Youm
8,920,238 B2 12/2014 Chun
9,214,060 B2 12/2015 Chun
9,495,826 B2 11/2016 Nicely et al.
9,595,159 B2 3/2017 Chun
9,666,024 B2 5/2017 Chun
2006/0166726 A1 7/2006 Chun
2007/0072682 A1 3/2007 Crawford, III et al.
2013/0178276 A1* 7/2013 Alderucci ............... G07F 17/32 463/25
2013/0190075 A1* 7/2013 Chun .................. G07F 17/3225 463/25
2015/0379826 A1 12/2015 Snow et al.

(Continued)

FOREIGN PATENT DOCUMENTS

CN 102933267 2/2013

OTHER PUBLICATIONS

International Search Report and Written Opinion dated Mar. 26, 2018 on related application PCT/IB2017/001418 filed Nov. 22, 2017.

(Continued)

*Primary Examiner* — James S. McClellan
(74) *Attorney, Agent, or Firm* — EIP US LLP

(57) ABSTRACT

An electronic table game ("ETG") system in which a sequence of cards dealt by a common dealer is used to generate a real-time data stream of card identities communicated to a plurality of different player terminals, thereby allowing the different player terminals to provide different games utilizing the same card identities.

20 Claims, 9 Drawing Sheets

(56) References Cited

U.S. PATENT DOCUMENTS

| | | | |
|---|---|---|---|
| 2015/0379827 | A1 | 12/2015 | Snow et al. |
| 2016/0171812 | A1 | 6/2016 | Dinkla |
| 2017/0301188 | A1* | 10/2017 | Pececnik ............. G07F 17/3293 |

OTHER PUBLICATIONS

Macau Search Report dated Jan. 31, 2019 for Application No. U/000215(608).

* cited by examiner

| TIMELINE STEP | DESCRIPTION | EXAMPLE |
|---|---|---|
| 2-a | Before the player joins the game, the dealer will continue dealing cards at the prescribed interval. | Dealer deals: JD, 4D, 8C, 2S, etc. |
| 2-b | The player selects a game to play at the player station. The display will then display the appropriate layout for the selected game. | Player selects Blackjack<br><br>Display shows a Blackjack layout<br><br>Dealer continues dealing: KD, AC… |
| 2-c | The player transfers money to the player station, which increments a credit meter associated with the player station. | Player deposits $100 into the bill acceptor<br><br>Dealer continues dealing: 4H, 9C… |
| 2-d | The player inputs a desired wager to place on a play of the selected game. | Player inputs a wager amount of $25<br><br>Dealer continues dealing: 6H |
| 2-e | The player confirms the wager by selecting the "DEAL" button, which decrements the credit meter | Dealer continues dealing: 10D |
| 2-f | The next card dealt by the dealer becomes the first card for this play of the game. | Next card: 7C (to player's hand) |
| 2-g | Each successive card dealt by the dealer becomes part of this game and is applied in the order in which cards are traditionally dealt until the game gets to a point requiring a decision by the player. | Next card: QC (dealer's hand)<br><br>Next card: 5D (player's hand is 7C 5D) |
| 2-h | The display shows the options and associated inputs for the player. | Player may Stand, Hit, Double Down<br><br>Dealer continues dealing (but cards are not allocated to this game): AH, 3D… |
| 2-i | The player makes an input associated with their desired option. Play resumes with the next dealt cards becoming part of the game until the game is completed. | Player selects "Hit" button<br><br>Next card: 10S (player's hand is 7C 5D 10S)<br><br>Player busts |
| 2-j | The system then determines the game outcome, and increments the credit meter with any winnings. | Player loses - Game over |
| 2-k | The player may return to step 2-a, or cash out any remaining money in the credit meter. | Player selects "Cash Out" and receives a ticket having a value of $75 |

FIG. 2

| TIMELINE STEP | CARDS DEALT | PLAYER 1 | PLAYER 2 | PLAYER 3 | PLAYER 4 | PLAYER 5 |
|---|---|---|---|---|---|---|
| 3-a | 7C | **Begins Play** | | | **Begins Play** | |
| 3-b | 5D | 1st Card: 5D | **Begins Play** | | 1st Card: 5D | |
| 3-c | QC | 2nd Card: QC | 1st Card: QC | | 2nd Card: QC | |
| 3-d | AH | 3rd Card: AH | 2nd Card: AH | **Begins Play** | 3rd Card: AH | |
| 3-e | 3D | 4th Card: 3D | 3rd Card: 3D | 1st Card: 3D | **Delays Decision** | |
| 3-f | 10S | 5th Card: 10S | 4th Card: 10S | 2nd Card: 10S | 4th Card: 10S | **Begins Play** |
| 3-g | JS | 6th Card: JS | 5th Card: JS | 3rd Card: JS | 5th Card: JS | 1st Card: JS |
| 3-h | 2H | 7th Card: 2H | 6th Card: 2H | 4th Card: 2H | 6th Card: 2H | 2nd Card: 2H |
| 3-i | KH | 8th Card: KH | 7th Card: KH | 5th Card: KH | 7th Card: KH | 3rd Card: KH |

FIG. 3

| TIMELINE STEP | CARDS DEALT | BLACKJACK | | | BLACKJACK | | | MIDI BACCARAT | | | CASINO WAR | | |
|---|---|---|---|---|---|---|---|---|---|---|---|---|---|
| | | Player 1 Hand | House Hand | Result or Action | Player 2 Hand | House Hand | Result or Action | Player 3 Hand | House Hand | Result or Action | Player 4 Hand | House Hand | Result or Action |
| 4-a | 7S | **Player 1 wagers & begins play** | | | **Player 2 wagers & begins play** | | | **Player 3 wagers on "Player" & begins play** | | | **Player 4 wagers & begins play** | | |
| 4-b | 10H | 10H | | | 10H | | | 10H | | | 10H | | |
| 4-c | 2D | 10H | 2D | | 10H | 2D | | 10H | 2D | | 10H | 2D | Player 4 wins |
| 4-d | 3H | 10H 3H | | Player 1 stands | 10H 3H | | Player 2 hits | 10H 3H | 2D | | **Player 3 wagers & begins play** | | |
| 4-e | 7S | 10H 3H | 2D 7S | | 10H 3H 7S | 2D | Player 2 stands | 10H 3H | 2D 7S | Player 3 loses | 7S | | |
| 4-f | QC | 10H 3H | 2D 7S QC | Player 1 loses | 10H 3H 7S | 2D QC | | **Player 3 does not take action before next card is dealt** | | | 7S | QC | Player 4 loses |
| 4-g | 9S | **Player 1 wagers & begins play** | | | 10H 3H 7S | 2D QC 9S | Player 2 loses | **Player 3 wagers on "Player" & begins play** | | | **Player wagers & begins play** | | |
| 4-h | 4C | 4C | | | **Player 2 wagers & begins play** | | | 4C | | | 4C | | |
| 4-i | KC | 4C | KC | | KC | | | 4C | KC | | 4C | KC | Player 4 loses |
| 4-j | 6H | 4C 6H | KC | Player 1 hits | KC | 6H | | 4C 6H | KC | | **Player 4 wagers & begins play** | | |
| 4-k | JD | 4C 6H JD | KC | Player 1 stands | KC JD | 6H | Player 2 stands | 4C 6H | KC JD | | JD | | |
| 4-l | 8S | 4C 6H JD | KC 8S | Player 1 wins | KC JD | 6H 8S | | 4C 6H 8S | KC JD | | JD | 8S | Player 4 wins |
| 4-m | 7D | **Player 1 does not take action before next card is dealt** | | | KC JD | 6H 8S 7D | Player 2 loses | 4C 6H 8S | KC JD 7D | Player 3 wins | **Player 4 does not take action before next card is dealt** | | |

FIG. 4

| TIMELINE STEP | CARDS DEALT | BLACKJACK | | | THREE CARD POKER | | | CARIBBEAN STUD® | | | LET IT RIDE® | |
|---|---|---|---|---|---|---|---|---|---|---|---|---|
| | | Player 1 Hand | House Hand | Result or Action | Player 2 Hand | House Hand | Result or Action | Player 3 Hand | House Hand | Result or Action | Player 4 Hand | Result or Action |
| 5-a | 2H | **Player 1 wagers & begins play** | | | **Player 2 wagers & begins play** | | | **Player 3 wagers & begins play** | | | **Player 4 wagers & begins play** | |
| 5-b | AC | AC | | | AC | | | AC | | | AC | |
| 5-c | 9D | AC | 9D | | AC 9D | | | AC 9D | | | AC 9D | |
| 5-d | 9H | AC 9H | 9D | Player 1 stands | AC 9D 9H | | Player 2 raises | AC 9D 9H | | | AC 9D 9H | Player 4 pulls back first bet |
| 5-e | 6C | AC 9H | 9D 6C | | AC 9D 9H | 6C | | AC 9D 9H 6C | | | AC 9D 9H 6C | Player 4 pulls back second bet |
| 5-f | KD | AC 9H | 9D 6C KD | Player 1 wins | AC 9D 9H | 6C KD | | AC 9D 9H 6C KD | | | AC 9D 9H 6C KD | Player 4 loses |
| 5-g | 8H | **Player 1 cashes out and leaves** | | | AC 9D 9H | 6C KD 8H | Player2 wins | AC 9D 9H 6C KD | 8H | Player 3 raises | **Player 4 cashes out and leaves** | |
| 5-h | 10S | | | | **Player 2 cashes out and leaves** | | | AC 9D 9H 6C KD | 8H 10S | | | |
| 5-i | 4H | | | | | | | AC 9D 9H 6C KD | 8H 10S 4H | | | |
| 5-j | 10C | | | | | | | AC 9D 9H 6C KD | 8H 10S 4H 10C | | | |
| 5-k | 7S | | | | | | | AC 9D 9H 6C KD | 8H 10S 4H 10C 7S | Player 3 loses | | |

FIG. 5

| TIMELINE STEP | CARDS DEALT | BLACKJACK | | | THREE CARD POKER | | | CARIBBEAN STUD® | | | LET IT RIDE® | |
|---|---|---|---|---|---|---|---|---|---|---|---|---|
| | | Player 1 Hand | House Hand | Result or Action | Player 2 Hand | House Hand | Result or Action | Player 3 Hand | House Hand | Result or Action | Player 4 Hand | Result or Action |
| 6-a | 2H | **Player 1 wagers & begins play** | | | **Player 2 wagers & begins play** | | | **Player 3 wagers & begins play** | | | **Player 4 wagers & begins play** | |
| 6-b | AC | AC | | | AC | | | AC | | | AC | |
| 6-c | 9D | AC | 9D | | AC 9D | | | AC 9D | | | AC 9D | |
| 6-d | 9H | AC 9H | 9D | | AC 9D 9H | | | AC 9D 9H | | | AC 9D 9H | |
| 6-e | 6C | (Player delay – no card) | | Player 1 stands | (Player delay – no card) | | | AC 9D 9H 6C | | | (Player delay – no card) | |
| 6-f | KD | AC 9H | 9D KD | Player 1 wins | (Player delay – no card) | | | AC 9D 9H 6C KD | | | (Player delay – no card) | |
| 6-g | 8H | **Player 1 cashes out and leaves** | | | (Player delay – no card) | | Player 2 raises | AC 9D 9H 6C KD | 8H | Player 3 raises | (Player delay – no card) | Player 4 pulls back first bet |
| 6-h | 10S | | | | AC 9D 9H | 10S | | AC 9D 9H 6C KD | 8H 10S | | AC 9D 9H 10S | |
| 6-i | 4H | | | | AC 9D 9H | 10S 4H | | AC 9D 9H 6C KD | 8H 10S 4H | | (Player delay – no card) | Player 4 pulls back second bet |
| 6-j | 10C | | | | AC 9D 9H | 10S 4H 10C | Player 2 loses | AC 9D 9H 6C KD | 8H 10S 4H 10C | | AC 9D 9H 10S 10C | Player 4 wins |
| 6-k | 7S | | | | **Player 2 cashes out and leaves** | | | AC 9D 9H 6C KD | 8H 10S 4H 10S 7S | Player 3 loses | **Player 4 cashes out and leaves** | |

FIG. 6

| TIMELINE STEP | CARDS DEALT | BLACKJACK | | | | BLACKJACK | | |
|---|---|---|---|---|---|---|---|---|
| | | Player 1 Hand 1 | Player 1 Hand 2 | House Hand | Result or Action | Player 2 Hand | House Hand | Result or Action |
| 7-a | 2S | **Player 1 wagers & begins play** | | | | **Player 2 wagers & begins play** | | |
| 7-b | 10H | 10H | | | | 10H | | |
| 7-c | 2D | 10H | 2D | | | 10H | 2D | |
| 7-d | QC | 10H | 2D | QC | | 10H QC | 2D | Player 2 stands |
| 7-e | 3H | 10H 3H | 2D | QC | | 10H QC | 2D 3H | |
| 7-f | 7S | 10H 3H | 2D 7S | QC | Player 1 hits hand 1 | 10H QC | 2D 3H 7S | |
| 7-g | 8S | 10H 3H 8S | 2D 7S | QC | Player 1 stands hand 1 Player hits hand 2 | 10H QC | 2D 3H 7S 8S | Player 2 pushes |
| 7-h | 4C | 10H 3H 8S | 2D 7S 4C | QC | Player 1 hits hand 2 | **Player 2 wagers & begins play** | | |
| 7-i | KC | 10H 3H 8S | 2D 7S 4C KC | QC | Player 1 loses hand 2 | KC | | |
| 7-j | 6H | 10H 3H 8S | (Bust) | QC 6H | | KC | 6H | |
| 4-k | JD | 10H 3H 8S | (Bust) | QC 6H JD | Player 1 wins hand 1 | KC JD | 6H | Player 2 stands |
| 7-l | 8H | **Player 1 does not initiate play** | | | | KC JD | 6H 8H | |
| 7-m | 7D | | | | | KC JD | 6H 8H 7D | Player 2 loses |

FIG. 7

| TIMELINE STEP | CARDS DEALT | THREE CARD POKER | | | CARIBBEAN STUD® | | | LET IT RIDE® | |
|---|---|---|---|---|---|---|---|---|---|
| | | Player 1 Hand | House Hand | Result or Action | Player 2 Hand | House Hand | Result or Action | Player 3 Hand | Result or Action |
| 8-a | 3S | **Player 1 wagers & begins play** | | | **Player 2 wagers & begins play** | | | **Player 3 wagers & begins play** | |
| 8-b | AC | AC | | | AC | | | AC | |
| 8-c | 9D | AC 9D | | | AC 9D | | | AC 9D | |
| 8-d | 9H | AC 9D 9H | | Player 1 raises | AC 9D 9H | | | AC 9D 9H | Player 3 pulls back first bet |
| 8-e | 10S | AC 9D 9H | 10S | | AC 9D 9H 10S | | | AC 9D 9H 10S | Player 3 pulls back second bet |
| 8-f | 4H | AC 9D 9H | 10S 4H | | AC 9D 9H 10S 4H | | | AC 9D 9H 10S 4H | Player 3 loses, progressive hand complete |
| 8-g | 10C | AC 9D 9H | 10S 4H 10C | Player 1 loses, draw continues for progressive award determination | AC 9D 9H 10S 4H | 10C | Player 2 raises | **Player 3 cashes out and leaves** | |
| 8-h | 9S | AC 9D 9H 9S | | | AC 9D 9H 10S 4H | 10C 9S | | | |
| 8-i | 9C | AC 9D 9H 9S 9C | | Progressive hand complete | AC 9D 9H 10S 4H | 10C 9S 9C | | | |
| 8-j | 2D | **Player 1 does not initiate play** | | | AC 9D 9H 10S 4H | 10C 9S 9C 2D | | | |
| 8-k | 10H | **Player 1 cashes out and leaves** | | | AC 9D 9H 10S 4H | 10C 9S 9C 2D 10H | Player 2 loses, progressive hand complete | | |

FIG. 8

MULTIPLAYER AND MULTIGAME ELECTRONIC WAGERING TABLE GAME SYSTEM USING LIVE DEALER

CROSS-REFERENCE TO RELATED APPLICATIONS

This application claims the benefit of U.S. Provisional Patent Application No. 62/425,287, filed on Nov. 22, 2016, the entire contents of which are hereby incorporated by reference.

BACKGROUND OF THE INVENTION

Field of the Invention

The present disclosure relates to an electronic table game ("ETG") system in which a sequence of cards dealt by a common dealer is used to generate a real-time data stream of card identities communicated to a plurality of different player terminals, in which the player terminals are configured to apply the card identities from the data stream to either one of the player hand or dealer hand according to the rules of a game being provided by the respective ETG.

Description of the Related Technology

In wagering games, wagers (or "bets") are typically placed on the possible outcomes of a game, and a payout for the game may be based on the amount of the wager, the outcome of the game (e.g., a comparison of hands between a player and a dealer), and an associated payout structure for the game. Such wagering games are often referred to as casino games as they are often associated with casinos.

ETGs that involve playing cards can utilize a varying range of dealer options, from a live-dealer drawing physical cards all the way to a fully automated dealer utilizing a random number generator ("RNG") to draw virtual cards. However, each dealer option is typically limited to dealing for a single type of game. This is predominantly due to the different rules various types of games have, such as beginning and ending times, which cards are hidden vs. which cards are visible to players, community cards vs. dealer cards vs. player cards, timing of the dealing of cards in relation to when wagers are allowed, number of cards dealt, and so on.

It is therefore desirable to provide a system that allows ETGs to share a common dealer, whether it be a live dealer or an RNG-based dealer. It is further desirable to allow a single dealer to simultaneously deal for different types of games. It is also desirable for a single dealer to deal for asynchronous games. It is still further desirable to allow a single dealer to continuously deal playing cards without the need to stop dealing activities for a shuffling of the cards.

SUMMARY

The present disclosure teaches an electronic table game ("ETG") system in which a sequence of cards dealt by a common dealer is used to generate a real-time data stream of card identities communicated to a plurality of different player terminals, thereby allowing the different player terminals to provide different games utilizing the same card identities.

In one example, the present disclosure describes an electronic table game system comprising a physical playing card dealer table, a card detection system configured to automatically determine a card identity of each of a plurality of physical playing cards dealt on the physical playing card dealer table, a game server in communication with the card detection system, the game server comprising at least one server processor and at least one server memory device storing server instructions which when executed by the at least one server processor cause the game server to: receive a card identity from the card detection system, identify the received card identity as a latest card identity, associate the latest card identity with a data stream; and repeating those steps for each of the plurality of physical playing cards as they are subsequently dealt. The electronic table game system further includes a plurality of player stations in communication with the game server, each of the player stations comprising at least one input device, at least one display device, at least one processor, and at least one memory device storing a plurality of instructions, which when executed by the at least one processor, cause the at least one processor to operate with the at least one input device and the at least one display device to: cause the display device to display a plurality of different games which can be played on the player station, receive a first input from a player which indicates a game to be played, cause the display device to display a game layout based on the first input, receive a second input from the player associated with a wager placed on the game to be played, receive the data stream from the game server, associate the latest card identity with a card position in the game, allow a physical playing card to subsequently be dealt, and repeating those steps until the game allows the player to make a decision or the game ends. When the player is allowed to make a decision, the player station will cause the display device to display at least one game option, receive a game option input from the player; and repeat the steps of receiving and associating card identities. When the game ends, the player station will determine any awards based at least in part on the card identities associated with the card positions in the game and the wager and provide any determined awards to the player.

In another example, the present disclosure describes a method of operating an electronic table game system, the method comprising the steps of enabling the sequential dealing of a plurality of physical playing cards, determining a card identify for each of the dealt physical playing cards, creating a data stream of the determined card identities, communicating the data stream to a first player station, wherein the first player station is providing a first card game based on a first wager, associating, by the first player station, a first plurality of determined card identities of the data stream with the first card game, determining, by the first player station, a first game outcome based on the associated first plurality of determined card identities, providing, by the first player station, any awards based on the determined first game outcome, communicating the data stream to a second player station, wherein the second player station is providing a second card game based on a second wager, wherein the second card game is asynchronous from the first card game, associating, by the second player station, a second plurality of determined card identities of the data stream with the second card game, wherein the second plurality of determined card identities comprises a plurality, but less than all, of the first plurality of determined card identities, determining, by the second player station, a second game outcome based on the associated second plurality of determined card identities, and providing, by the second player station, any awards based on the determined second game outcome.

In still another example, the present disclosure describes a player station comprising, at least one input device, at least one display device, at least one processor, and at least one memory device storing a plurality of instructions, which when executed by the at least one processor, cause the at least one processor to operate with the at least one input device and the at least one display device to: cause the display device to display a plurality of different games which can be played on the player station, receive a first input from a player which indicates a game to be played, cause the display device to display a game layout based on the first input, receive a second input from the player associated with a wager placed on the game to be played, receive the data stream from the game server, wherein the data stream comprises a plurality of card identities in a random order, selectively associate a plurality of the received card identities with the game, wherein the association of at least one received card identity is based on a timing of when a third input from the player is received, the third input indicating an in-game decision by the player, determine any awards based at least in part on the associated card identities and the wager, and provide any determined awards to the player.

It is therefore an advantage of the present disclosure to provide a system that allows a single dealer to provide card identities for multiple different and/or asynchronously played games.

It should be understood that various changes and modifications to the presently disclosed embodiments described herein will be apparent to those skilled in the art. Such changes and modifications can be made without departing from the spirit and scope of the present subject matter and without diminishing its intended advantages.

BRIEF DESCRIPTION OF THE DRAWINGS

FIG. 2 is a timeline table illustrating the steps of dealing and playing a game in accordance with one embodiment of the present disclosure.

FIG. 3 is a timeline table illustrating an example of the electronic wagering table game system allocating cards to different players during their asynchronous play, in accordance with one embodiment of the present disclosure.

FIG. 4 is a timeline table illustrating an example of the electronic wagering table game system managing four players playing different multi-deck card games, in accordance with one embodiment of the present disclosure.

FIG. 5 is a timeline table illustrating an example of the electronic wagering table game system managing four players playing different single-deck card games, in accordance with one embodiment of the present disclosure.

FIG. 6 is a timeline table illustrating an example of the electronic wagering table game system allocating cards to different players asynchronously playing different games, in accordance with one embodiment of the present disclosure.

FIG. 7 is a timeline table illustrating an example of the electronic wagering table game system managing a player playing two hands and another player playing one hand, in accordance with one embodiment of the present disclosure.

FIG. 8 is a timeline table illustrating an example of the electronic wagering table game system providing a progressive jackpot, in accordance with one embodiment of the present disclosure.

DETAILED DESCRIPTION OF CERTAIN INVENTIVE EMBODIMENTS

Figure 1A:
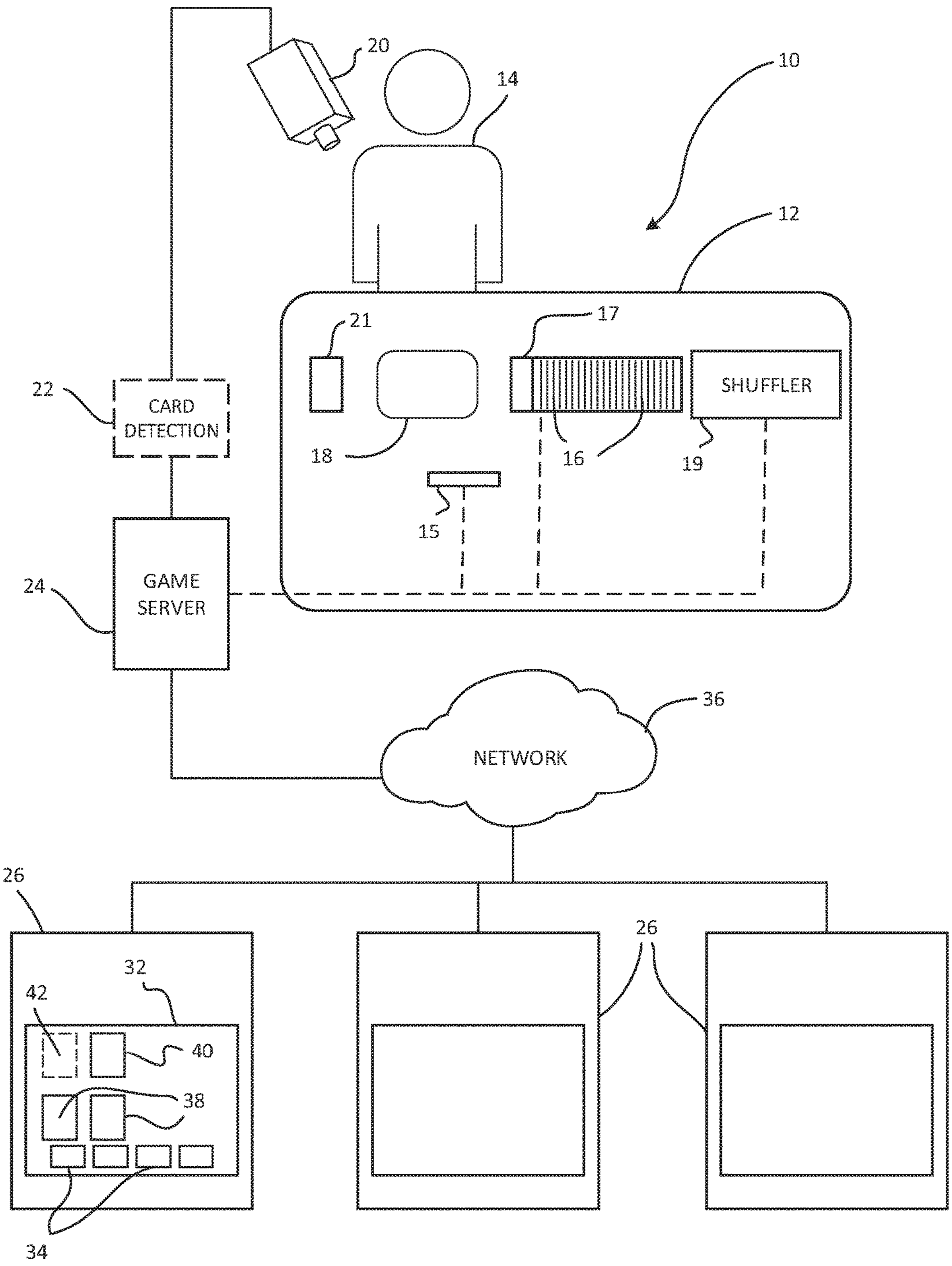
FIG. 1A is a schematic representation of the electronic wagering table game system in accordance with one embodiment of the present disclosure.

Referring to the accompanying figures, there is illustrated an electronic wagering table game system generally indicated in FIG. 1A by reference numeral 10.

In one embodiment, the system 10 generally includes a playing card dealer table 12 for use by a live dealer 14 to deal physical playing card(s) 16 from a card shoe 17. The dealer 14 draws the cards 16 when prompted by deal prompt 15, so that the cards are dealt individually to a playing area 18 on the table 12. In one embodiment, deal prompt 15 is a simple mechanical, electrical, and/or electro-mechanical device, such as a clock or timed light, which provides the dealer 14 with a simple visual, audio, or audio-visual signal to indicate it is time to deal another card. In another embodiment, deal prompt 15 is networked with a game server 24. In a further embodiment, game server 24 may send commands to deal prompt 15 to cause the deal prompt 15 to provide an indication for the dealer 14 to deal the next card. In such an embodiment, it is contemplated that the game server 24 may adjust the duration between dealt cards based on predetermined criteria, such as the current number of players, types of games currently being played, fraud prevention, randomness, or any combination thereof. In another embodiment, deal prompt 15 may be a smart device that is configured to determine, based on internal programming, when to prompt the dealer 14 to deal the next card, and may then communicate such action to the game server 24. In a further embodiment, deal prompt 15 is a video screen that is capable of providing additional information to the dealer 14 beyond just whether or not to deal the next card. In a further embodiment, the system 10 does not include a deal prompt 15. In one example of such an embodiment, the dealer 14 may simply deal cards at a desired pace. It should be appreciated that a dealer 14 may develop a relatively constant pace based on practice, thereby removing the need for dealer prompt 15. In another example of such an embodiment, dealer 14 is a virtual dealer, and is configured to deal cards at a predetermined rate and/or based on communications with game server 24.

Continuing with FIG. 1A, it is further contemplated in this embodiment to have a video camera 20 positioned so that it can capture dealt cards in playing area 18. The video camera 20 is in communication with a card detection unit 22, which is shown in dashed format simply to further illustrate that it may be located at various parts of the electronic wagering table game system 10. As illustrated in FIG. 1A, the card detection unit is a separate unit from game server 24. In such an example, card detection unit 22 is configured to receive the video input from the video camera 20, process the video image files, determine both the rank and suit of the dealt card, and then communicate such details to game server 24. In another embodiment, card detection unit 22 is part of the game server 24. In a further embodiment, card detection unit 22 is at least partially co-located with game server 24. Examples of such co-location include sharing of processing resources between game server 24 and card detection unit 22, sharing of memory resources between game server 24 and card detection unit 22, sharing of an external housing structure, sharing of power between game server 24 and card detection unit 22, or any combination thereof. In a further embodiment, the card detection unit 22 is communicatively connected to further devices utilized to detect the dealt playing cards, such as additional cameras, RFID readers, smart card shoes which are configured to read the cards as they are taken from the card shoe, or any combination thereof. In another embodiment, the card detection unit 22 is itself a smart card shoe which reads the cards as they are taken from the card shoe, and communicates the identification of the dealt card to game server 24. In a further embodiment, card detection unit 22 is a part of video camera 20 and shares a common housing. The various components of the of the card detection process, as disclosed herein, may be collectively referred to as a card detection system, and should be understood to encompass both the physical hardware and associated programming for automatically recognizing the attributes (e.g., rank and suit) of a dealt physical card.

In a further embodiment, the card detection system comprises a dealer input mechanism (not shown) which allows the dealer 14 to manually input the rank and suit of the dealt card. In one embodiment, the card detection unit 22 first attempts to properly detect a dealt card, and the dealer is then required to authorize or override such a determination through such a dealer input mechanism. In another embodiment, the dealer 14 is required to input the rank and suit of a dealt card, and the card detection system associates such input with the video image from the video camera 20, which may then be communicated to the player stations 26.

Continuing with the example of FIG. 1A, the card detection unit 22 is communicatively connected to game server 24, which itself is connected to network 36 to communicate with a plurality of player terminals 26. Game server 24 is illustrated as a single unit, but it is contemplated that it may comprise several computer nodes or computer devices. Game server 24 comprises memory devices and at least one processor, which is configured to manage the system 10 as described herein. In one embodiment, game server 24 is co-located with or located near card dealer table 12. In another embodiment, game server is located separately from the card dealer table 12, perhaps at a secure location within a casino. In another embodiment, a player terminal 26 may also be configured to be a game server 24. In still a further embodiment, game server 24 may be located remotely from both the card dealer table 12 and player stations 26, perhaps offsite or even within a secure cloud computing facility. However, it is contemplated that many benefits may be realized by having game server 24 at the same casino sight as both the card dealer table 12 and player stations 26, such as increasing security, complying with gaming regulatory requirements, and increasing player trust.

Player terminals 26 (discussed in more detail with respect to FIG. 1B) include a display 32 and player input areas 34. In one embodiment, display 32 is a touch display and player input areas 34 are simply designated parts of the touch display. In another embodiment, player input areas 34 are physical buttons.

For illustrative purposes, one of the player stations 26 further displays face up player cards 38, a face up dealer card(s) 40, and a face down dealer card 42. As will be discussed in further detail below, while display 32 displays a face down dealer card 42, in one embodiment, the player station 26 and/or game server 24 may not have allocated a card to the face down dealer card 42, and may be waiting for a player action before such an allocation takes place. In another embodiment, the display 32 displays a live video feed of the cards being dealt by dealer 14. In a further embodiment, the display 32 only displays the video feed of cards being dealt by dealer 14 for those cards that form part of the player's cards 38 or the dealer's face up cards 40. In a further embodiment, the display 32 does not provide any video feeds of the dealer 14.

Returning back to the card dealer table 12 in FIG. 1A, it is contemplated that after a card 16 has been dealt to playing area 18, it is then moved to discard area 21 before the next card 16 is dealt. Then, after a number of cards 16 have been dealt, the dealer 14 may return the cards to a card shuffler 19. In the illustrated embodiment, card shuffler 19 is shown as a separate unit from card shoe 17, but it is contemplated that such units could be combined into a single unit. In another embodiment, card shuffler 19 is a smart shuffler, which comprises a separate RNG which is utilized in the shuffling of the cards 16, to provide an additional level of randomness and/or security to the shuffling of the cards 16. In another contemplated embodiment, discard area 21 is configured to automatically move discarded cards to card shuffler 19, without the dealer 14 being required to physically touch the cards.

In another embodiment, card shuffler is in communication with game server 24, which is illustrated in FIG. 1A with a dashed communication line. In such an example, it is contemplated that the game server may control when the cards are shuffled. In one embodiment, game server 24, card shoe 17, and card shuffler 19 work together to allow the dealer 14 to continuously deal playing cards 16 without having to delay the dealing operations for a re-shuffle of all of the cards 16. For example, it is contemplated that game server 24 may track how many cards 16 have been dealt since the last shuffle, and when certain criteria have been satisfied, cause the deal prompt 15 to indicate to the dealer that the shuffler should be loaded with the previously-dealt/discarded cards, and then cause the shuffler 19 to shuffle the cards and reintroduce them to the card shoe 17.

For example, it is contemplated that in an example of one embodiment, only a set number of decks of cards (e.g., five) are allowed to be in play at any particular time, but that the system is configured to track more decks of cards (e.g., six or more). In such an example, the game server 24 may track the cards 16 not in play, including cards 16 located at the discard area 21 and cards located in the shuffler 19, and assure that no more than the allowable five decks of cards 16 are contained within the card shoe 17 at any given time. In such an example, the game server 24 may periodically cause an indication to the dealer 14, for example via the deal prompt 15, to move cards from the discard area to the shuffler, and when certain criteria are satisfied, cause the shuffler 19 to shuffle the cards 16 and reintroduce the shuffled cards to the card shoe 17. For example, when the number of cards 16 remaining in the card shoe 17 is below a set number (e.g., sixty), and the number of previously-dealt cards located at the discard area 21 is above a set number (e.g., fifty-two), the game server 24 may cause the shuffler 19 to shuffle all of the previously-dealt cards 16 which were previously moved from the discard area 21 to the shuffler 19 by the dealer 14, and then cause the now-shuffled cards to be re-introduced to the card shoe 17. In one embodiment, the game server is configured to track the exact cards located in the discard area 21. In such an example, the game server 24 may be further configured to make sure that the cumulative cards 16 located in the discard area 21 comprise a full deck of cards (e.g., all fifty-two distinct playing cards) before and instruction is given to shuffle the cards and reintroduce them to the shuffler 17.

In another embodiment, discard area 21 may form part of the determination process as to when cards are to be moved to the shuffler 19. For example, there could be multiple discard areas 21, each having a different height of walls which work to retain cards in an organized manner, which the dealer alternately discards cards to, and when any one becomes full, the dealer could then remove the cards in that particular area and place them in the shuffler 19. In another example, the discard area 21 could have an adjustable height of walls, which may be controlled by game server 24 or by a dedicated programming or RNG, and when such a discard area becomes full, the dealer could then remove the cards and place them in the shuffler 19. As is evident from this disclosure, several methods of maintaining underlying gameplay characteristics while providing a continuous deal by the dealer 14 are contemplated, and each example should not be construed as providing the only examples herein contemplated.

In further embodiments, it is contemplated that one or more of the physical components of the system 10 from FIG. 1A could be replaced by an automated or virtual component without departing from the present disclosure. For example, the live dealer 14 could be a robotic dealer. In another embodiment, the dealer 14, card shoe 17 and physical cards 16 could be virtual, which would provide an RNG-based dealing of virtual cards. In such an embodiment, it will be appreciated that the system 10 would no longer comprise a video camera 20 or a card detection unit 22, and the game server 24 would have direct communication with the virtual card shoe. While it is specifically contemplated that players may desire live dealers dealing physical cards, it is understood that not all casinos reside in jurisdictions which allow some or all of such physical features, so the system 10 of the present disclosure may be configured in order to operate without such physical features.

In another contemplated embodiment, game server 24 may be in communication with a table game management system (not shown). Examples of table game management systems include Table Manager by IGT and Bally Table Management System™ by Scientific Games. It is contemplated that such a table management system may communicate with game server 24 directly, through network 36, or form part of game server 24. In another embodiment, an additional display device associated with such a table game management system may be positioned so that the live dealer 14 could view it. In still another embodiment, such an associated display device may be touchscreen, to allow the dealer 14 to provide inputs back to the table game system. In a further embodiment, the dealer 14 may utilize such a table game management system to assist the card detection system in determining the rank and suit of a dealt card. In another embodiment, such a table game management system may supplement or replace other components of the system 10 as illustrated in FIG. 1A. For example, a display device associated with a table game management system (not shown) may be utilized additionally as a deal prompt, thereby removing the need for a separate deal prompt 15.

Figure 1B:
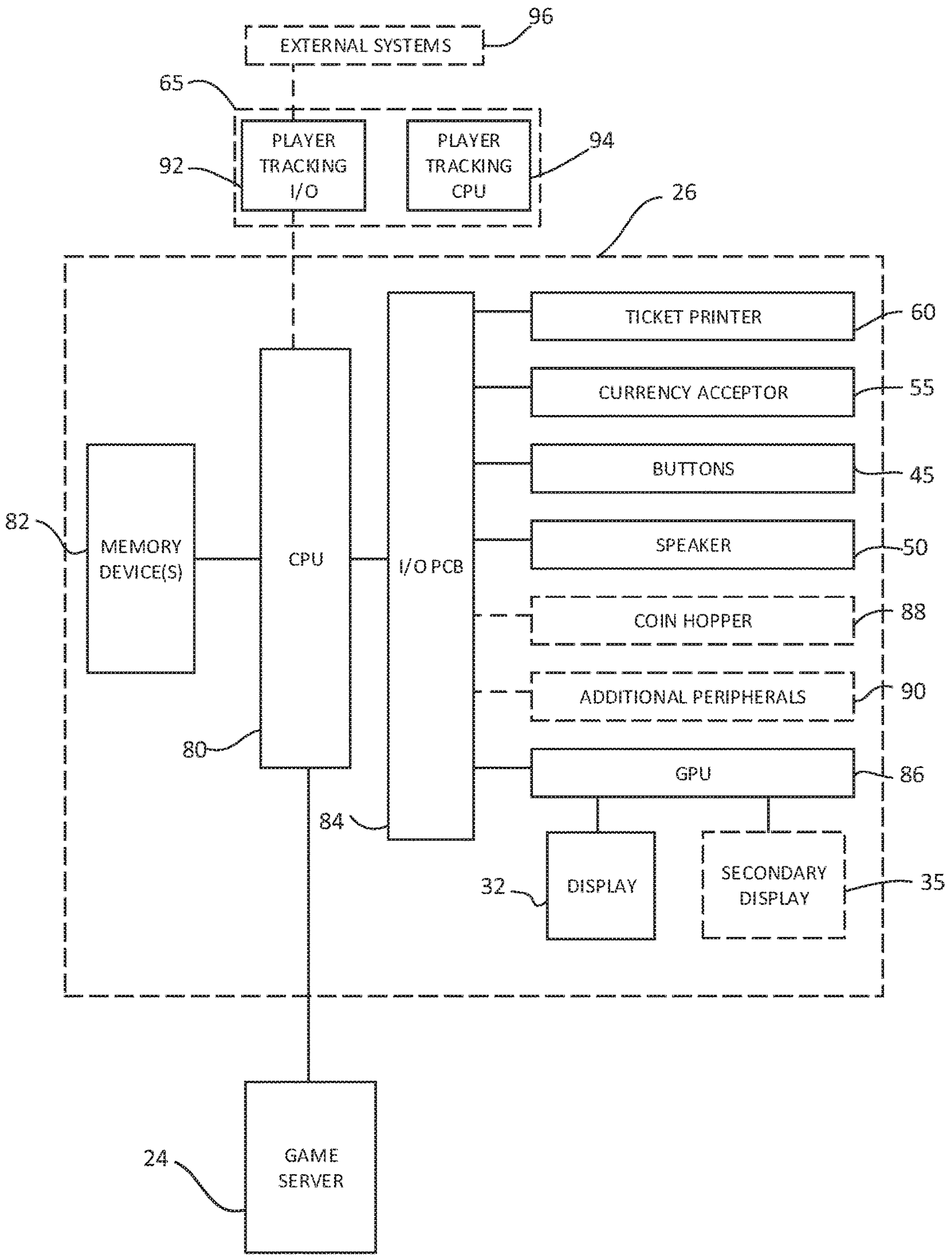
FIG. 1B is a schematic representation of a player station in accordance with one embodiment of the present disclosure.

FIG. 1B is a schematic diagram of a player station 26 in accordance with one embodiment of the present disclosure. In this embodiment, player station 26 utilizes a computer processing unit (CPU) 80, such as a processor, a microprocessor, or the like. CPU 80 can perform arithmetic and logical operations, and can also extract instructions from memory device(s) 82 and decode and execute them. Alternatively, it is contemplated that instead of CPU 80, an array processor or vector processor has multiple parallel computing elements, which utilizes a distributed computing model, to perform such arithmetic and logical operations.

Memory device(s) 82 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood by a person of skill in the art. In one embodiment, the memory device(s) 82 includes read only memory (ROM), which may, for example, store regulatory-sensitive instructions for player station 26. In one embodiment, the memory device(s) 82 includes flash memory and/or EEPROM (electrically erasable programmable read only memory). Any other suitable magnetic, optical and/or semiconductor memory may operate in conjunction with the player station 26 disclosed herein.

CPU 80 may be communicatively connected to at least one input/output printed circuit board (I/O PCB) 84 which operates as an electrical interface between CPU 80 and various peripherals of the player station 26. FIG. 1B further illustrates various peripherals, including ticket printer 60, currency acceptor 55, buttons 45, speakers 50, coin hopper 88, and other additional peripherals 90. In one embodiment, ticket printer 60 and currency acceptor 55 are combined into a single peripheral. It is contemplated that ticket printer 60 and/or currency acceptor 55 are configured to accept physical indicia of monetary value, such as money, which may then be converted to credits by the player station 26 for wagering by a player. Also illustrated is a graphic processing unit (GPU) 86, which works in coordination with CPU 80 to control the display 32 and a possible secondary display 35, and causes them to display various aspects of a game.

Also communicatively connected to CPU 80 may be a player tracking device 65. It is contemplated that the player tracking device 65 includes a distinct player tracking input/output (I/O) 92 and player tracking CPU 94, as well as associated player tracking memory (not shown). In one embodiment, it is contemplated that player tracking device 65 could have a direct line of communication (not shown) with ticket printer 60. In such an embodiment, the player tracking device 65 could then cause ticket printer 60 to print out promotional tickets without having to first communicate with gaming machine CPU 80, which may be desirable to comply with regulatory requirements. FIG. 1B also illustrates that player station 26 is communicatively connected to external systems 96, which could include one or more of an accounting system, player tracking system, player bonusing system, player assistance system, server-based gaming system or other game content management system, wide area network (WAN), local area network (LAN), the internet, or other communication systems. FIG. 1B further illustrates another embodiment wherein player station 26 is in direct communication with game server 24.

Games offered on gaming machines such as player station 26 can be widely varied and diverse. However, all such games typically must meet very stringent requirements, which assure their fairness and perhaps even their appearance of fairness. Generally speaking, games must return to players, in the form of monetary awards, on average, somewhere between 75% and 100% of all wagers accepted, which is referred to as payback percentage. Specific payback requirements are specific to each of the hundreds of regulated gaming jurisdictions worldwide, but generally fall within such a range, and must be statistically verifiable over numerous plays. Many such jurisdictions have additional requirements related to how a game outcome is determined, whether the outcome is completely random, primarily random, unpredictable by a player, or to what effects a player's skill level can have on an outcome. This is also true for card-based games, such as those contemplated for the system 10.

Programming instructions are stored on the memory devices of both the game server 24 and the player stations 26. In one embodiment, each player station 26 receives a data stream from the game server 24, the data stream comprising the sequence of card identities as determined by the card detection unit 22. The programming instructions, in either or both of the game server 24 and player stations 26, then dictate rules of play according to a game selected by a player at each respective game station 26, and applies the card identities from the data stream sequentially to cards for the selected game according to the rules of play for the selected game. In another embodiment, rules of a game regarding when cards are dealt may be modified so that a player may not realize an advantage. For example, while the game of blackjack traditionally deals both of the dealer's cards before players decide to make their game-based decisions (e.g., hit or stand, etc.), doing so with system 10 may allow a player to observe another player station 26 that is at a different stage in the continuous deal, and therefor might provide the player an advantage by seeing what card was dealt face down to the dealer. However, it is contemplated that dealer face down cards may not be dealt until after the player makes their appropriate game-based decisions, so as to prevent such potential security issues.

Regardless of when an individual player joined a game, the dealer continues to deal cards at a prescribed time interval. In one embodiment, this interval is constant or is intended to be constant but is subject to the live dealer's 14 physical movements, so may have slight deviations. In another embodiment, the interval is determined by the game server 24, and relayed to the live dealer 14 via the deal prompt 15. It is contemplated that in such an embodiment, the game server 24 may deviate the interval based on one or more factors, such as the number of active players, the number of like games currently being played, the number of different games currently being played, desired randomness, cheating avoidance, the number of cards remaining in the card shoe 17, the number of remaining full decks remaining in the card shoe 17, the number of cards located at discard area 21, the number of full decks located at discard area 21, the number of cards located at the card shuffler 19, the number of full decks located at the card shuffler, the actual or average speed of play of the current active players, the timing of active player actions such as making rapid in-game decisions/inputs, operator desired game turnover, regulation-based requirements, and any combination of one or more thereof.

As described in further detail below with regard to gameplay, different player stations 26 can use the card identities from the same live data stream regardless of what point within the gameplay different players are at and regardless of whether different players are playing the same or different games. For example, the same card identity can be simultaneously used on different player stations 26 in different ways such that a player card on one terminal or station is used as either a face up or facedown dealer card on another terminal or station. Likewise, the first card dealt as a player or dealer card on one player station 26 at the beginning of a wagering round may be simultaneously used as a subsequent player or dealer card within a respective round of wagering on a different player station 26.

FIGS. 2-8 will now be discussed, and it should be appreciated that these timeline tables provide several examples of how the present disclosure may be implemented. It should also be appreciated that these timeline tables also act as flowcharts for the purposes of describing the underlying programming required to implement the present disclosure. For these timeline tables, rank and suits of cards have been shortened according to the following legend:

| | |
|---|---|
| 2, 3, 4, 5, 6, 7, 8, 9, 10 | Numerical rank of identified card, 2-10 |
| J | Jack |
| Q | Queen |
| K | King |
| A | Ace |
| D | Diamonds |
| C | Clubs |
| S | Spades |
| H | Hearts |

Examples:
AH = Ace of Hearts;
4D = 4 of Diamonds;
4C 6H = 2 cards, 4 of Clubs and 6 of Hearts Referring to FIG. 2, an example where a single player is utilizing the present system will be discussed. At step 2-*a*, the player has not yet made a wager or otherwise begun play of a game. However, as indicated in the "Example" column, the dealer continues to deal, and in this example, deals a Jack of Diamonds, a 4 of Clubs, an 8 of Clubs, a 2 of Spades, etc. At step 2-*b*, the player has now selected a game, and the display of the player station then displays an appropriate layout. In this example, the player selects Blackjack, so the display of the player station displays a Blackjack layout. And as further confirmed in the "Example" column, the dealer continues to deal cards, but these cards are not yet part of the player's game as the players has not yet made a wager or otherwise initiated a play of the game.

At step 2-*c*, the player now transfers money to the player station, which then increments an associated credit meter. In one embodiment, the player may transfer money via a bill acceptor. In another embodiment, the player transfers money via a ticket-in-ticket-out (TITO) device. In a further embodiment, the bill acceptor and TITO device are combined into a single device which is configured to accept both physical money and tickets. In another embodiment, the player can use their smartphone to transfer money to the player station. In a further embodiment, money may be transferred from a player tracking account, a casino marketing account, another player's account, or a combination thereof. In similar fashion as the prior steps, the dealer continues to deal cards which may have been associated with the player had the player placed a wager.

At step 2-*d*, the player inputs a wager amount, for example $25. In this embodiment, just the act of inputting a wager amount does not cause the game to begin, but rather requires the player, at step 2-*e*, to select the "DEAL" button. In this manner, the player is allowed to change their wager selection by, for example, increasing, decreasing, or removing the wager altogether, before the player is committed to playing a game. In other embodiments, the player station may be configured to automatically begin the play of the game upon the selection of a wager amount by the player. As illustrated in FIG. 2, the dealer continues dealing apart from the player's actions, and the dealt cards are simply not associated with the player's hand. But once the player initiates the play of the game (e.g., selects the "DEAL" button), the next card dealt by the dealer is associated with the play of the game, as illustrated at step 2-*f*, which in this example is a 7 of Clubs. Step 2-*g* illustrates that the player's hand and the dealer's face up card are comprised of the next two dealt cards. In one embodiment, the cards associated with the player's hand and the dealer's face up card are dealt in a familiar format of alternating which is dealt to (e.g., first card to the player, second card to the dealer, third card to the player). In another embodiment, the player's hand is fully dealt prior to the dealer receiving the initial face-up card.

At step 2-*h*, the player is provided the typical in-game choice for Blackjack, which may include to Stand, Hit, Double Down, Split, Surrender, or other in-game choices that are common in card games. However, where historically card games have already dealt the second card but just placed it facedown, in this embodiment, the second card has not yet been allocated to the dealer. In this manner, this process would prevent the player from possibly viewing the card dealt immediately after the 5 of Diamonds, perhaps on an adjacent player station where the player there is at a different stage of their game or playing a different game altogether, and thereby gain an advantage. Instead, the system of the present embodiment continues to deal cards, but does not associate the dealt cards to the player's game until after the player has made their selection, thereby continuing the game. At step 2-*i*, the player selects the "Hit" button, which is communicated to the system, and thereafter the next dealt card is associated with the player's hand. In this example, the player receives a 10 of Spades, and busts because of it. In can be appreciated that in this example, the dealer's hand only comprised one card at the end of the game, however it should be appreciated that this did not significantly affect the ultimate outcome of the game. This is especially true in situations where multiple decks are used, which are common place now in most casinos.

At step 2-*j*, the system determines the outcome of the game, and increments the credit meter if the player won an award. In the present example, the player did not win, so the credit meter would not increment. At step 2-*k*, the player is allowed to return to step 2-*a*, which allows them to sit at the game while the dealer continues to deal, select a new game to play, play the same game, change their bet level, or replay the same game with the same wager. Alternatively, the player may cash out any remaining money from the player station, and move on to another casino offering.

FIG. 3 provides an illustrative example of asynchronous play by five players. In this example, the specific games each of the players are playing has not been identified, simply in order to clearly illustrate how different players can have different cards allocated to their game based on their timing of certain activities. Timeline steps 3-*a* through 3-*i* reflect the consecutive dealing of playing cards by the dealer, as shown in the "Cards Dealt" column. In this example, Player 1 begins play just after the dealer has dealt the first card, but continues to play and make any associated player mid-game choices in a timely manner, so that each of the next eight cards are associated with Player 1's game. Player 2, Player 3, and Player 5 have similar examples, except that each of those players begins play at later times, so that the cards dealt by the dealer form a different component of their games. For example, at step 3-*h*, the dealt card is a 2 of Hearts, which forms the $7^{th}$ card of Player 1's game, forms the $6^{th}$ card of Player 2's game, forms the $4^{th}$ card of Player 3's game, and forms the $2^{nd}$ card of Player 5's game. As can be appreciated, and as further illustrated below, this can impact the outcome of each individual player's game. In regards to Player 4, at step 3-*e*, Player 4 delays a mid-game decision, and therefore the card dealt at this step (3 of Diamonds), which is part of the data stream from the game server, is not associated with Player 4's game. This has further ramifications, in that the next dealt card (10 of Spades) forms the $5^{th}$ card of Player 1's game, but forms the $4^{th}$ card of Player 4's game, even though they began playing at substantially the same time.

FIG. 4 illustrates a more complicated example of asynchronous play of similar and different games, which the present disclosure now enables. Similar to the other figures, timeline steps 4-*a* through 4-*m* correlate to different cards dealt, which as discussed above, are dealt at prescribed intervals. In this example, four different players at four different player stations are playing three different games, Blackjack, Midi Baccarat, and Casino War. As was the case with other examples discussed herein, while the individual players are making their wagers and beginning play of their respective games, the dealer continues to deal, which is illustrated here at step 4-*a* with the 7 of Spades being dealt but not being allocated to any of the four games. However, as each of the players begin play at the same time, each has the same card assigned as the first card for their game, at step 4-*b*.

Looking at Player 1 and Player 2 from FIG. 4, there is an example of two players playing the same game simultaneously but which results in different outcomes due to actions by the respective players. For example, at step 4-*c*, each of Player 1 and Player 2 have the same hand (10 of Hearts and 3 of Hearts) as does the dealer (2 of Diamonds). However, at step 4-*d*, Player 1 stands while Player 2 hits. Not only does this result in the players having different hands, but also results in the dealer having a different hand as between the two games. Again, this is due to the dealer not being dealt a facedown card until the player is completed with its in-game decisions. In this case, Player 1 did not hit at step 4-*d*, so the next two cards at steps 4-*e* and 4-*f* were associated with the dealer's hand to form a hand of 2 of Diamonds, 7 of Spades, and Queen of Clubs, which resulted in the dealer having 19 and Player 1 losing. But now looking at Player 2, they received an additional card due to their decision to hit, so at step 4-*e*, the 7 of Spades is associated with Player 2's hand. This then results in the dealer receiving cards at steps 4-*f* and 4-*g* (Queen of Clubs and 9 of Spades), which also means that Player 2 loses this hand. From here, Player 1 and Player 2 continue to play asynchronously, though they are playing from the same dealer and a common set of cards.

Continuing with FIG. 4, Player 3 is playing Midi Baccarat, and after the fourth card is dealt at step 4-3, loses the first game. However, instead of immediately playing, Player 3 takes a couple of cycles before beginning the play of the next game. In this example, that means that Player 3's first card for their next game occurs at step 4-*h*. Ultimately, this results in a win for Player 3 at step 4-*m*, in this example. It should be appreciated that in this example, as well as others contained herein, it is illustrated that players miss dealt cards while they are wagering between games (e.g., at step 4-*g* for Player 1 or step 4-*h* for Player 2), but that this is merely to show that players who take time to complete actions may miss the next dealt card. However, it is expressly contemplated that players may be quick enough, and the electronic wagering table game system disclosed herein is configured to accept, successive wagers by a player so that the player does not necessarily "miss" the next card dealt.

FIG. 4 further illustrates a player, Player 4, competing in multiple rounds of Casino War. As is evident, the present disclosure enables a single dealer to facilitate multiple different, games to be played, simultaneously and asynchronously, which provides great efficiencies for operators. Further, as disclosed herein, such games can be provided without a material departure from accustomed game play.

FIG. 5 illustrates another example of the system disclosed herein being utilized to simultaneously enable the play of four distinct games, Blackjack, Three Card Poker, CARIBBEAN STUD® (CARIBBEAN STUD is a registered trademark of Bally Gaming, Inc.), and LET IT RIDE® (LET IT RIDE is a registered trademark of Bally Gaming, Inc.). Timeline steps 5-*a* though 5-*k* represent the continuous dealing of cards, and the associated application of these cards in each of the respective games. For example, at step 5-*c*, Player 1 has an Ace of Clubs while the house has a 9 of Diamonds, but Player 2's hand has both the Ace of Clubs and the 9 of Diamonds.

FIG. 6 helps illustrate how player actions can affect the game outcomes. Specifically, timeline steps 6-*a* through 6-*k* represent the same continuous dealing of cards as FIG. 5, but with different results for Player 1, Player 2, and Player 4, based on each respective player's actions. For example, if Player 1 stands at step 5-*d*, which causes the next dealt card to be dealt to the house hand at step 5-*e*, then the house hand busts when the King of Diamonds is then dealt to the house hand at step 5-*f*. But in FIG. 6, Player 1 does not immediately stand, but allows another card to be dealt by the dealer before then standing, which results in the 6 of Clubs not being associated with the game, but rather the King of Diamonds (at step 6-*f*) being the next card, from the data stream, to be associated with the game, and specifically form part of the house hand. Ultimately, Player 1 wins in both scenarios, but did so by different means.

By contrast, Player 2's different play between FIGS. 5 & 6 does lead to different win/loss results for Player 2. Specifically, Player 2 immediately raises in FIG. 5 at step 5-*d*, which then allows the next card dealt to be associated with the house hand at step 5-*e*. In the example in FIG. 5, Player 2 ultimately wins at step 5-*g*. However, in FIG. 6, Player 2 delays until step 6-*g* to raise, which results in the cards dealt at steps 6-*e* through 6-*g* to not be associated with Player 2's game. After Player 2 raises at step 6-*g*, then the subsequent cards from the data stream are associated with Player 2's game, which ultimately results in Player 2 losing at step 6-*j*.

A similar scenario is illustrated with respect to Player 4, in that in FIG. 5, Player 4 does not delay any mid-game/player decisions, which ultimately results in Player 4 losing at step 5-*f*. However, in FIG. 6, Player 4 does delay in making decisions at steps 6-*e* through 6-*g*, and again at step 6-I, which changes the cards from the data stream that are associated with Player 4's game, and ultimately results in Player 4 winning at step 6-*j*.

FIG. 7 illustrates how the present disclosure can also be utilized to allow a single player to play multiple hands of a single game or multiple different games. In this example, Player 1 is playing two hands—Hand 1 and Hand 2. Gameplay in this example is similar to the other embodiments disclosed herein, in that timeline steps 7-*a* through 7-*m* represent the data stream of consecutive dealt cards, and the cards are associated with each of the respective hands and games based on player action. In this example, Player 1 begins play (at step 7-*a*) and thereafter the first card from the data stream (10 of Hearts) is associated with Player 1's Hand 1, and the next card from the data stream (2 of Diamonds) is associated with Player 1's Hand 2. From here, the gameplay is consistent with traditional blackjack when a player is playing multiple hands against a dealer, as illustrated further in FIG. 7. FIG. 7 also illustrates how another player, Player 2, may play Blackjack separately from Player 1, but utilizing the same data stream as Player 1, without being affected by Player 1's actions.

FIG. 8 is similar to the previous examples, except here each of the players are also eligible for a progressive award. As is known by persons of skill in the art, various additional or bonus games may be added to table games. Sometimes, a player is automatically entered into such games. Other times, a player may be required to wager a side bet in order to be eligible for such games. Awards associated with such games may be a progressive award (as illustrated in FIG. 8) or simply a bet multiplier, such as 50× times the qualifying bet. In the example illustrated by FIG. 8, it is contemplated that each of Player 1, Player 2, and Player 3 have made the necessary wagers to be eligible for a progressive award, and the determination of whether or not a player wins the progressive award is based on the player's five-card hand. The electronic wagering table game system of the present disclosure can be configured to deal five cards to each qualifying player, even if, as illustrated in regards to Player 1, the player has already lost the base game and the rules of the base game do not typically require the dealing of five cards.

While the present disclosure provides numerous examples of card game which the presently contemplated system may be configured to provide, others are equally contemplated, such as variants of Blackjack, Baccarat games and variants, Pai Gow Poker, Texas Hold'em and variants, MISSISSIPPI STUD® (MISSISSIPPI STUD is a registered trademark of Bally Gaming, Inc.), Texas Hold'em Bonus Poker, Ultimate Texas Hold'em, and other card-based wagering games. It is specifically contemplated that the electronic wagering table game system of the present disclosure may be utilized for any card-based wagering game where a player plays against a house or dealer.

What is claimed is:

1. An electronic table game system comprising:

a physical playing card dealer table;

a card detection system configured to determine a card identity of each of a plurality of physical playing cards dealt on the physical playing card dealer table;

a game server in communication with the card detection system, the game server comprising at least one server processor and at least one server memory device storing server instructions which when executed by the at least one server processor cause the game server to:

(a) receive a card identity from the card detection system;

(b) identify the received card identity as a latest card identity;

(c) associate the latest card identity with a data stream; and (d) repeat steps (a) to (d) for each of the plurality of physical playing cards as they are subsequently dealt;

a plurality of player stations in communication with the game server, each of the player stations comprising at least one input device, at least one display device, at least one processor, and at least one memory device storing a plurality of instructions, which when executed by the at least one processor, cause the at least one processor to operate with the at least one input device and the at least one display device to:

(i) cause the at least one display device to display a plurality of different games which can be played on the player station, each of the plurality of different games having different game rules;

(ii) receive a first input from a player which indicates a game to be played;

(iii) cause the at least one display device to display a game layout from a plurality of different game layouts, the displayed game layout being based on the first input;

(iv) receive a second input from the player associated with a wager placed on the game to be played;

(v) receive the data stream from the game server;

(vi) associate the latest card identity with a card position in the game;

(vii) allow a physical playing card to subsequently be dealt;

(viii) repeat steps (v) to (vii) until the game allows the player to make a decision or the game ends;

(ix) when the player is allowed to make a decision:

a. without causing the game server to delay the associating of the latest card identity with the data stream, discontinue the associating of the latest card identity with a card position in the game;

b. cause the display device to display at least one game option;

c. receive a game option input from the player; and d. repeat steps v) to vii);

(x) when the game ends:

a. determine any awards based at least in part on the card identities associated with the card positions in the game and the wager; and b. provide any determined awards to the player.

2. The electronic table game system of claim 1, further comprising:

a deal prompt configured to cause an audio or visual indication to a dealer to indicate that the dealer should deal another physical playing card from the plurality of physical playing cards.

3. The electronic table game system of claim 2, wherein:

the deal prompt is in communication with the game server; and the deal prompt indicates that the dealer should deal another physical playing card from the plurality of physical playing cards based on communications from the game server.

4. The electronic table game system of claim 1, further comprising;

a card shoe configured to hold the plurality of physical playing cards; and an automatic card shuffler configured to resupply the card shoe with shuffled physical playing cards prior to the card shoe reaching a level which would prevent further dealing of physical playing cards by a dealer.

5. The electronic table game system of claim 4, wherein the automatic card shuffler is further configured to shuffle the physical playing cards based on communications received from the game server.

6. The electronic table game system of claim 1, wherein the card detection system is at least partially co-located with the game server.

7. The electronic table game system of claim 1, wherein the card detection system comprises at least one video camera.

8. A method of operating an electronic table game system wherein a plurality of physical playing cards are sequentially dealt, the method comprising the steps of:

(i) determining a card identify for each of the dealt physical playing cards;

(ii) generating a data stream of the determined card identities;

(iii) communicating the data stream to a first player station, wherein the first player station is providing a first card game based on a first wager;

(iv) associating, by the first player station, a first plurality of determined card identities of the data stream with the first card game;

(v) determining, by the first player station, a first game outcome based on the associated first plurality of determined card identities;

(vi) providing, by the first player station, any first award based on the determined first game outcome;

(vii) communicating the data stream to a second player station, wherein the second player station is providing a second card game based on a second wager, wherein the second card game is asynchronous from the first card game;

(viii) associating, by the second player station, a second plurality of determined card identities of the data stream with the second card game, wherein the second plurality of determined card identities comprises a plurality, but less than all, of the first plurality of determined card identities;

(ix) determining, by the second player station, a second game outcome based on the associated second plurality of determined card identities; and (x) providing, by the second player station, any second award based on the determined second game outcome.

9. The method of claim 8, wherein the first card game and the second card game are a same type of card game.

10. The method of claim 8, wherein the first card game and the second card game are a different type of card game.

11. The method of claim 8, wherein a same card identity is associated as a first card with both the first and second card games.

12. The method of claim 8, wherein an amount of time between when two physical cards of the plurality of physical cards are sequentially dealt is based on a predefined timing criteria.

13. The method of claim 8, wherein an amount of time between when two physical cards of the plurality of physical cards are sequentially dealt is based on a determination made by the game server.

14. A player station comprising:

at least one acceptor configured to accept a physical indicia of monetary value;

at least one input device;

at least one display device;

at least one processor; and at least one memory device storing a plurality of instructions, which when executed by the at least one processor, cause the at least one processor to operate with the at least one input device and the at least one display device to:

(i) cause the at least one display device to display a plurality of different games which can be played on the player station, each of the different games having different game rules;

(ii) receive a first input from a player which indicates a game to be played;

(iii) cause the at least one display device to display a game layout from a plurality of different game layouts, the displayed game layout being based on the first input;

(iv) receive a second input from the player associated with a wager placed on the game to be played;

(v) receive a data stream from the game server, wherein the data stream comprises a plurality of card identities in a random order;

(vi) selectively associate a plurality of the received card identities with the game, wherein the association of at least one received card identity is based on a timing of when a third input from the player is received, the third input indicating an in-game decision by the player;

(vii) determine any awards based at least in part on the associated card identities and the wager; and (viii) provide any determined awards to the player.

15. The player station of claim 14, wherein the plurality of card identities in a random order represent a plurality of physical cards dealt by a dealer.

16. The player station of claim 15, wherein for each associated card identity, the display device is further caused to display a video of the physical card dealt by the dealer which is represented by the associated card identity.

17. The player station of claim 14, wherein a received card identity is not associated with a dealer face-down position in the game until after the player is prevented from making any further in-game decisions.

18. The player station of claim 14, wherein a received card identity is not associated with the game based on the timing of when the third input is received by the player.

19. The player station of claim 14, wherein the data stream further comprises a continuous stream of card identities that is not delayed due to any shuffling activities.

20. The player station of claim 14, wherein each selectively associated card identity is selectively associated based at least in part on a rule of the game and a timing of when the play of the game was initiated.

* * * * *